United States Patent [19]

Nishimura et al.

[11] Patent Number: 4,729,351

[45] Date of Patent: Mar. 8, 1988

[54] CYLINDER BLOCK CONSTRUCTION OF ENGINE

[75] Inventors: Kazuaki Nishimura; Hiroichi Takubo, both of Hiroshima, Japan; Kuniaki Kakui, deceased, late of Hiroshima, Japan, by Kayoko Kakui, administratrix

[73] Assignee: Mazda Motor Corporation, Hiroshima, Japan

[21] Appl. No.: 937,240

[22] Filed: Dec. 3, 1986

[30] Foreign Application Priority Data

Dec. 6, 1985 [JP] Japan ................................ 60-274663

[51] Int. Cl.⁴ .......................... F02F 7/00; F16F 15/28

[52] U.S. Cl. ............................ 123/195 A; 123/192 B; 123/198 E

[58] Field of Search ........... 123/192 R, 192 B, 198 E, 123/195 A, 195 R

[56] References Cited

U.S. PATENT DOCUMENTS 3,418,993 12/1968 Scheiterlein et al. .

3,511,110 5/1970 Grieve .

4,000,666 1/1977 Ito et al. .

4,028,963 6/1977 Nakamura et al. .

4,074,589 2/1978 Nakamura et al. .

4,125,036 11/1978 Nakamura et al. .

4,523,553 6/1985 Backlund ........................ 123/192 B 4,537,275 8/1985 Kimura .......................... 123/192 B

FOREIGN PATENT DOCUMENTS 58-13166 3/1983 Japan .

*Primary Examiner*—Douglas Hart

*Attorney, Agent, or Firm*—Burns, Doane, Swecker & Mathis

[57] ABSTRACT

A cylinder block construction of an engine having a pair of balancer shafts provided at its opposite sides, in which the cylinder block is formed with a pair of bearing boss portions for supporting the balancer shafts, respectively. The cylinder block construction includes a pair of mounting portions for securing a pair of engine mounts to the cylinder block, respectively, which are, respectively, provided, in the vicinity of the bearing boss portions, at opposite side walls of the cylinder block so as to be integrally formed with the bearing boss portions.

13 Claims, 2 Drawing Figures

CYLINDER BLOCK CONSTRUCTION OF ENGINE

BACKGROUND OF THE INVENTION

The present invention generally relates to engines and more particularly, to a cylinder block construction of an engine having a pair of balancer shafts provided at opposite sides thereof, in which mounting portions for securing engine mounts thereto are increased in rigidity.

Conventionally, for example, U.S. Pat. No. 4,000,666 has disclosed an engine in which a pair of balancer shafts each having an unbalanced portion are disposed at opposite sides of a cylinder block and are rotated synchronously with rotation of a crankshaft at the number of revolutions identical with the number of revolutions of the crankshaft multiplied by either 1 or an integer of 2 or more such that unbalance of primary or secondary or more couples of forces or inertia forces resulting from reciprocation of each piston is controlled by centrifugal forces applied to the unbalanced portions.

Meanwhile, in the case where such engine is mounted on a motor vehicle, it has been so arranged that a skirt portion of the cylinder block is coupled with the body of the motor vehicle through the engine mounts.

However, in the known engine, such a problem arises that since the skirt portions of the cylinder block have low rigidity structurally in the cylinder block, mounting portions of the skirt portions, which are provided for securing the engine mounts thereto, are required to be reinforced sufficiently in order to restrict vibrations of peripheral portions of the engine mounts, thereby resulting in increase of weight of the engine.

SUMMARY OF THE INVENTION

Accordingly, an essential object of the present invention is to provide a cylinder block construction of an engine having a pair of balancer shafts provided at opposite sides thereof, in which mounting portions for securing engine mounts thereto are reinforced through utilization of bearing boss portions for supporting the balancer shafts such that rigidity of peripheral portions of the engine mounts is increased without increase of weight of the engine, with substantial elimination of disadvantages inherent in conventional arrangements of this kind.

In order to accomplish this object of the present invention, a cylinder block construction of an engine having a pair of balancer shafts provided at opposite sides thereof, according to the present invention includes a pair of bearing boss portions for supporting said balancer shafts, respectively, the improvement comprising: a pair of mounting portions for securing a pair of engine mounts to said cylinder block, respectively being, respectively, provided, in the vicinity of said bearing boss portions, at opposite side walls of said cylinder block so as to be integrally formed with said bearing boss portions.

By the above described arrangement of the cylinder block construction of the present invention, the mounting portions for securing the engine mounts thereto are reinforced by the bearing boss portions for supporting the balancer shafts, which bearing boss portions have high rigidity in the cylinder block. Therefore, in accordance with the present invention, peripheral portions of the engine mounts are increased in rigidity.

Furthermore, in accordance with the present invention, since reinforcing members are not required to be provided for reinforcing the mounting portions for securing the engine mounts thereto, it becomes possible to prevent increase of weight of the engine.

BRIEF DESCRIPTION OF THE DRAWINGS

This object and features of the present invention will become apparent from the following description taken in conjucntion with the preferred embodiment thereof with reference to the accompanying drawings, in which.

Before the description of the present invention proceeds, it is to be noted that like parts are designated by like reference numerals throughout views of the accompanying drawings.

DETAILED DESCRIPTION OF THE INVENTION

Figure 1:
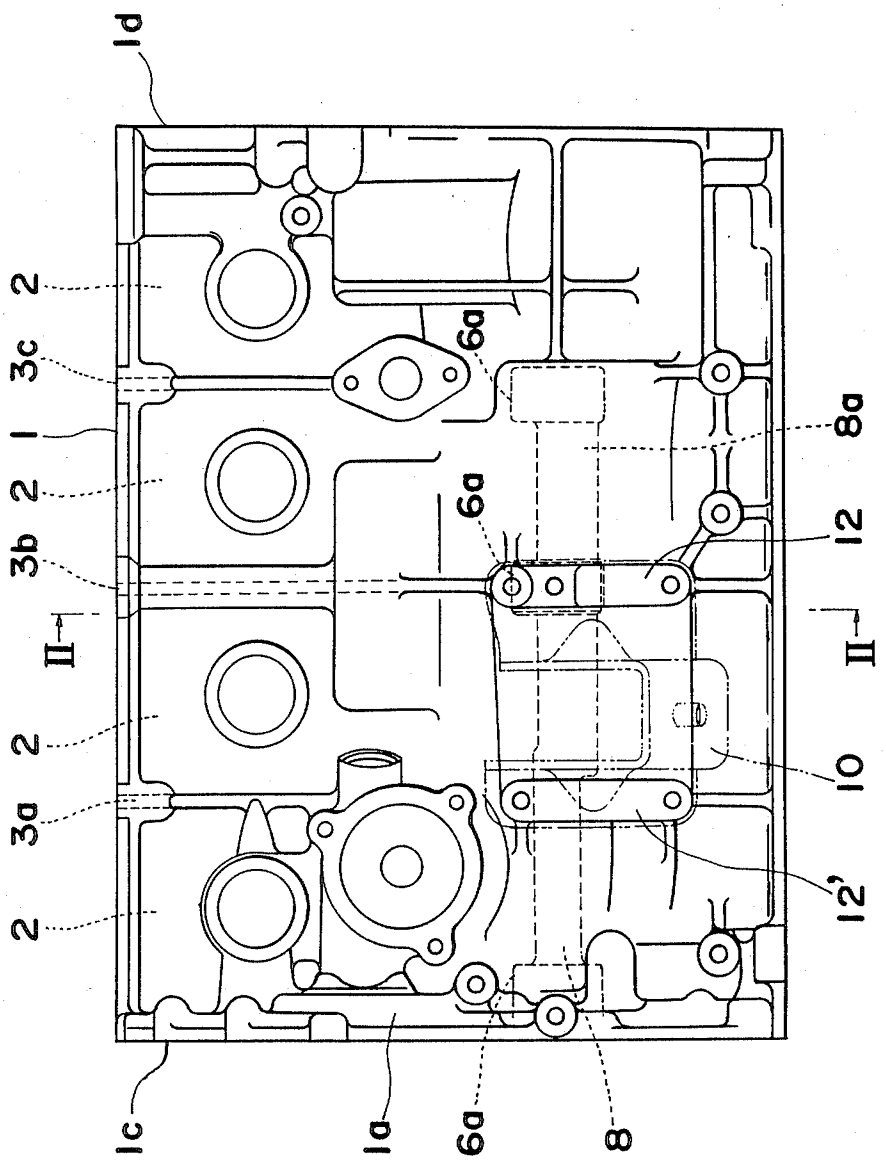
FIG. 1 is a side elevational view of a cylinder block of an engine, according to one preferred embodiment of the present invention.
Figure 2:
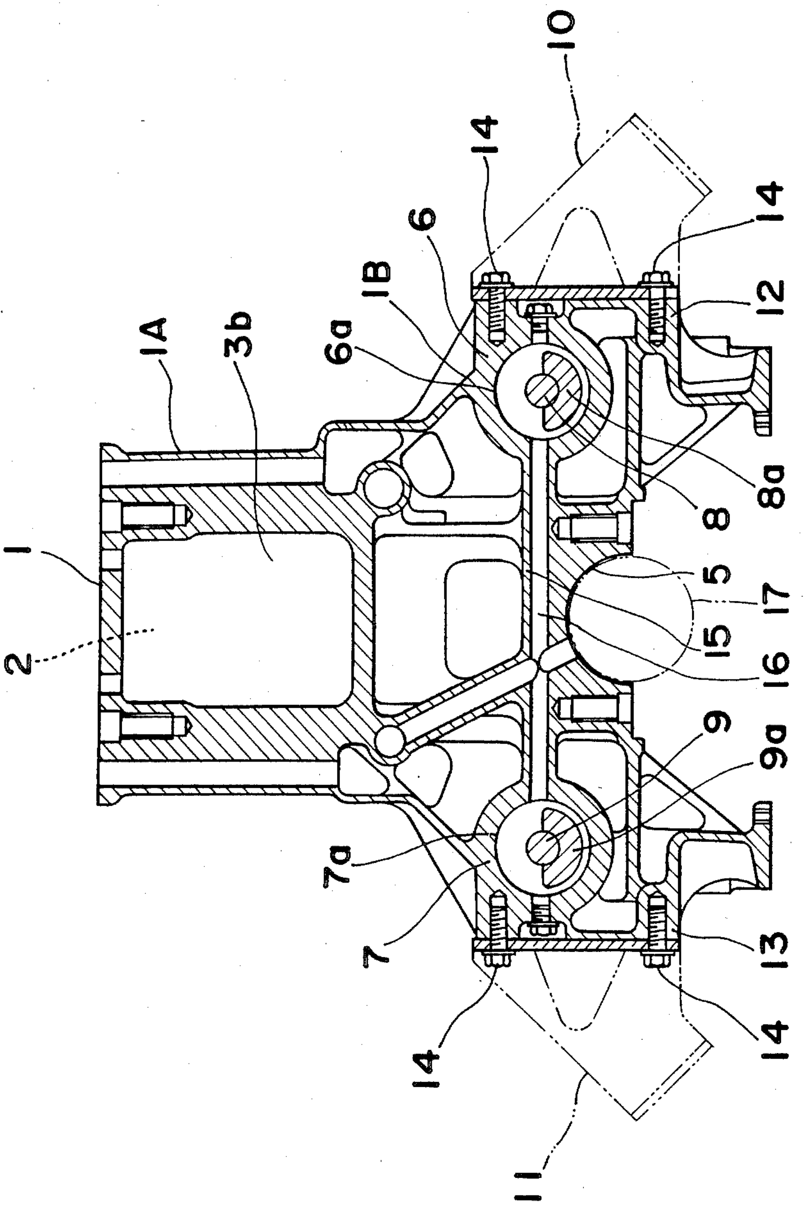
FIG. 2 is a sectional view taken along the line II—II in FIG. 1.

Referring now to the drawings, there is shown in FIGS. 1 and 2, a cylinder block 1 of an engine, according to one preferred embodiment of the present invention. The cylinder block 1 is formed with four cylinders 2 arranged in a longitudinal direction thereof. The cylinder block 1 is enclosed by a left side wall **1*a*, a right side wall 1*b*, a front wall 1*c* and a rear wall 1*d*. A first vertical wall 3*a*, a second vertical wall 3*b* and a third vertical wall 3*c* are provided between adjacent ones of the cylinders 2 so as to be arranged in this order rearwardly in the longitudinal direction of the cylinder block 1. The cylinder block 1 is further formed, at lower portions of the first, second and third vertical walls 3*a*, 3*b* and 3*c* and the front wall 1*c* and the rear wall 1*d*, with a bearing portion 5 for supporting a crankshaft 17. A left boss portion 6 and a right boss portion 7 each having a large section thickness are, respectively, formed at left and right sides of each of the front wall 1*c*, the second vertical wall 3*b* and the third vertical wall 3*c*. The left and right boss portions 6 and 7 are, respectively, formed with a left bearing portion 6*a* and a right bearing portion 7*a* such that a left balancer shaft 8 and a right balancer shaft 9 are rotatably supported by the left and right bearing portions 6*a* and 7*a*, respectively. The left and right balancer shafts 8 and 9 are, respectively, provided at opposite sides of the crankshaft so as to extend in the axial direction of the crankshaft. The left and right balancer shafts 8 and 9 are rotated at the number of revolutions twice as many as the number of revolutions of the crankshaft in directions opposite to each other. At a portion of the left balancer shaft 8, which extends between the first vertical wall 3*a* and the third vertical wall 3*c*, the left balancer shaft 8 is provided with an unbalanced portion 8*a* so as to project in a radial direction of the left balancer shaft 8. Likewise, at a portion of the right balancer shaft 9, which extends between the first vertical wall 3*a* and the third vertical wall 3*c*, the right balancer shaft 9 is provided with an unbalanced portion 9*a* so as to project in a radial direction of the right balancer shaft 9. Thus, in response to rotation of the left and right balancer shafts 8 and 9, unbalance of secondary couples of forces or inertia forces resulting from reciprocation of pistons fitted into the cylinders 2 is controlled by centrifugal forces applied to the unbalanced portions 8*a* and 9*a***.

Meanwhile, each of the second and third vertical walls 3*b* and 3*c* is formed with a boss 15 for connecting the left boss portion 6 and the right boss portion 7. A lubricating oil passage 16 extending, above the bearing portion 5, through the left and right boss portions 6 and 7 in a direction at right angles to the crankshaft is formed in the boss 15 so as to intersect with a feed passage for supplying lubricating oil to the bearing portion 5. Deformation of the cylinder block 1 due to horizontal inertia forces produced in the left and right balancer shafts 8 and 9 is prevented by the boss 15.

Furthermore, a vertically elongated mounting portion 12 for securing a left engine mount 10 thereto is provided, in the vicinity of the left boss portion 6 of the second vertical wall 3*b*, on the left side wall 1*a* so as to be integrally formed with the left bearing portion 6 of the second vertical wall 3*b*. Likewise, a vertically elongated mounting portion 13 for securing a right engine mount 11 thereto is provided, in the vicinity of the right boss portion 7 of the second vertical wall 3*b*, on the right side wall 1*b* so as to be integrally formed with the right bearing portion 7 of the second vertical wall 3*b*.

Similarly, a vertically elongated mounting portion 12' for securing the left engine mount 10 thereto is provided, in the vicinity of the first vertical wall 3*a*, on the left side wall 1*a*. Meanwhile, although not specifically shown, a vertically elongated mounting portion for securing the right engine mount 11 thereto is provided, in the vicinity of the first vertical wall 3*a*, on the right side wall 1*b*. Thus, the left engine mount 10 is mounted, at its inner end portion, on the the mounting portions 12 and 12' by bolts 14 such that an outer end portion of the left engine mount 10 is bolted to a body of a motor vehicle. Likewise, the right engine mount 11 is mounted, at its inner end portion, by the bolts 14 on the mounting portion 13 and th above described mounting portion (not shown) provided, in the vicinity of the first vertical wall 3*a*, on the right side wall 1*b* such that an outer end portion of the right engine mount 11 is bolted to the body of the motor vehicle. As shown in FIG. 2, the cylinder block 1 is constituted by a cylinder portion 1A in which the cylinders 2 are formed and a skirt portion 1B disposed below the cylinder portion 1A, in which the left and right balancer shafts 8 and 9 are arranged such that the mounting portions 12 and 12' and the mounting portion 13 and the mounting portion (not shown) referred to above are provided at opposite left and right side walls of the skirt portion 1B, respectively.

Accordingly, in the above described embodiment, the mounting portion 12 for the left engine mount 10 and the mounting portion 13 for the right engine mount 11 are, respectively, reinforced by the left boss portion 6 for the left balancer shaft 8 and the right boss portion 7 for the right balancer shaft 9, each of which has a large section thickness and high rigidity. Hence, since peripheral portions of the left engine mount 10 and the right engine mount 11 are increased in rigidity, it becomes possible to effectively restrict vibrations of the engine, thereby enhancing quiet drive of the motor vehicle.

Furthermore, in this embodiment, the mounting portions 12 and 13 are, respectively, reinforced by the left boss portion 6 and the right boss portion 7 which are essential for forming the left bearing portion 6*a* for the left balancer shaft 8 and the right bearing portion 7*a* for the right balancer shaft 9. Therefore, reinforcing members are not required to be additionally provided for reinforcing the mounting portions 12 and 13, thus preventing increase of weight of the engine.

As is clear from the foregoing description, in the cylinder block construction of the engine of the present invention, the mounting portions for the engine mounts are reinforced by the boss portions of high rigidity for supporting the balancer shafts. Accordingly, in accordance with the present invention, it becomes possible to increase rigidity of the peripheral portions of the engine mounts without incurring increase of weight of the engine.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In a cylinder block construction of an engine having a pair of balancer shafts provided at opposite sides thereof, said cylinder block being formed with a pair of bearing boss portions for supporting said balancer shafts, respectively, the improvement comprising:

a pair of first mounting portions for securing a pair of engine mounts to said cylinder block, respectively being, respectively, provided, in the vicinity of said bearing boss portions, at opposite side walls of said cylinder block so as to be integrally formed with said bearing boss portions.

2. A cylinder block construction as claimed in claim 1, wherein said cylinder block is constituted by a cylinder portion and a skirt portion disposed below said cylinder portion such that said balancer shafts are disposed in said skirt potion, said mounting portions being, respectively, provided at opposite side walls of said skirt portion.

3. A cylinder block construction as claimed in claim 2, wherein said balancer shafts are provided at opposite sides of an output shaft of said engine, respectively so as to extend parallel said output shaft.

4. A cylinder block construction as claimed in claim 3, wherein each of said mounting portions has a vertically elongated shape.

5. A cylinder block construction as claimed in claim 3, further including a boss for connecting said bearing boss portions, which is formed with a passage for supplying lubricating oil to said bearing boss portions such that said passage is communicated with a feed passage for feeding lubricating oil to a bearing portion for supporting said output shaft.

6. A cylinder block construction as claimed in claim 5, wherein said boss is so formed as to extend substantially horizontally in a direction perpendicular to the axial direction of said output shaft, said passage being formed by a machined hole extending, above said bearing portion in the direction perpendicular to the axial direction of said output shaft, through said boss.

7. A cylinder block construction as claimed in claim 1, further including a pair of second mounting portions for securing said engine mounts to said cylinder block, respectively.

8. A cylinder block construction as claimed in claim 7, wherein said second mounting portions are provided, in the vicinity of a vertical wall formed between adjacent ones of cylinders of said cylinder block, at said opposite side walls of said cylinder block, respectively.

9. A cylinder block construction as claimed in claim 7, wherein said engine includes multiple cylinders and said bearing boss portions are provided at a vertical wall between adjacent ones of said cylinders, with said vertical wall being disposed at a central portion of said cylinder block.

10. A cylinder block construction as claimed in claim 1, wherein said engine includes four cylinders and said balancer shafts extend parallel to an output shaft of said engine, said bearing boss portions each being formed by a first bearing boss part and a second bearing boss part, said first bearing boss part being provided at a front wall of said cylinder block, which is disposed forwardly of a first cylinder, said second bearing boss part being provided at a vertical wall formed between a second cylinder and a third cylinder such that each of said first mounting portions is integrally formed with said second bearing boss part.

11. A cylinder block construction as claimed in claim 10, wherein each of said mounting portions has a vertically elongated shape.

12. A cylinder block construction as claimed in claim 10, further including a pair of second mounting portions provided, in the vicinity of a vertical wall formed between said first cylinder and said second cylinder, at said opposite side walls of said cylinder block, respectively, one of said engine mounts being secured to said cylinder block so as to extend between one of said first mounting portions and one of said second mounting portions, the other one of said engine mounts being secured to said cylinder block so as to extend between the other one of said first mounting portions and the other one of said second mounting portions.

13. A cylinder block construction as claimed in claim 12, wherein each of said bearing boss portions further includes a third bearing boss part, said third bearing boss part being provided at a vertical wall of said cylinder block, which is formed between said third cylinder and a fourth cylinder.

* * * * *